(12) United States Patent
Hayashi et al.

(10) Patent No.: US 12,043,766 B2
(45) Date of Patent: *Jul. 23, 2024

(54) AQUEOUS ADHESIVE FOR INORGANIC MATERIALS

(71) Applicants: SANYO CHEMICAL INDUSTRIES, LTD., Kyoto (JP); MAG-ISOVER KABUSHIKI KAISHA, Tokyo (JP)

(72) Inventors: Miyuki Hayashi, Kyoto (JP); Ai Kita, Kyoto (JP); Masaya Tsukamoto, Tokyo (JP)

(73) Assignees: SANYO CHEMICAL INDUSTRIES, LTD., Kyoto (JP); MAG-ISOVER KABUSHIKI KAISHA, Tokyo (JP)

(*) Notice: Subject to any disclaimer, the term of this patent is extended or adjusted under 35 U.S.C. 154(b) by 729 days.

This patent is subject to a terminal disclaimer.

(21) Appl. No.: 17/072,733

(22) Filed: Oct. 16, 2020

(65) Prior Publication Data

US 2021/0032509 A1 Feb. 4, 2021

Related U.S. Application Data

(63) Continuation of application No. PCT/JP2019/016197, filed on Apr. 15, 2019.

(30) Foreign Application Priority Data

Apr. 18, 2018 (JP) .................... 2018-079770

(51) Int. Cl.
| | | |
|---|---|---|
| *C09J 11/08* | (2006.01) | |
| *C08F 120/06* | (2006.01) | |
| *C08F 120/08* | (2006.01) | |
| *C09J 11/06* | (2006.01) | |
| *C09J 105/00* | (2006.01) | |

(52) U.S. Cl.
CPC ............. *C09J 11/08* (2013.01); *C08F 120/06* (2013.01); *C08F 120/08* (2013.01); *C09J 11/06* (2013.01); *C09J 105/00* (2013.01)

(58) Field of Classification Search
CPC .......... C09J 11/08; C09J 11/06; C09J 105/00; C09J 201/08; C09J 201/00; C09J 167/00; C08F 120/06; C08F 120/08; C08F 20/18; C08F 22/00; C08L 3/02

See application file for complete search history.

(56) References Cited

U.S. PATENT DOCUMENTS

| | | | |
|---|---|---|---|
| 5,318,990 A | 6/1994 | Strauss | |
| 5,895,804 A | 4/1999 | Lee et al. | |
| 7,199,179 B2 | 4/2007 | Clamen et al. | |
| 8,623,234 B2 | 1/2014 | Jaffrennou et al. | |
| 2004/0254290 A1* | 12/2004 | Rodrigues | D04H 1/58 |
| 2005/0048212 A1 | 3/2005 | Clamen et al. | |
| 2007/0004835 A1 | 1/2007 | Finch et al. | |
| 2007/0102108 A1 | 5/2007 | Zhang et al. | |
| 2009/0162680 A1 | 6/2009 | Zheng et al. | |
| 2012/0064323 A1 | 3/2012 | Shoemake et al. | |
| 2012/0168054 A1 | 7/2012 | Chen et al. | |

FOREIGN PATENT DOCUMENTS

| | | |
|---|---|---|
| EA | 201070679 A1 | 12/2010 |
| EP | 1 486 516 B1 | 3/2010 |
| EP | 2 223 940 A1 | 9/2010 |
| GB | 1069439 A | 5/1967 |
| JP | H11-199786 A | 7/1999 |
| JP | 2000-273410 A | 10/2000 |
| JP | 2005-036204 A | 2/2005 |
| JP | 2005-068399 A | 3/2005 |
| JP | 2007-009206 A | 1/2007 |
| JP | 2014-515793 A1 | 7/2014 |
| JP | 2017-036366 A | 2/2017 |
| JP | 2017-122148 A | 7/2017 |
| JP | 2017-226826 A | 12/2017 |
| RU | 2413614 C2 | 3/2011 |
| RU | 2605134 C2 | 12/2016 |
| WO | WO 2012/138723 A1 | 10/2012 |
| WO | WO 2014/008947 A1 | 1/2014 |
| WO | WO 2017/072186 A1 | 5/2017 |
| WO | WO 2017/074853 A1 | 5/2017 |

OTHER PUBLICATIONS

HR Office Action as issued in Russian Patent Application No. 2020137589, dated Jan. 21, 2022.
Extended European Search Report as issued in European Patent Application No. 19789470.2, dated May 6, 2021.
International Search Report as issued in International Patent Application No. PCT/JP2019/016197, dated May 21, 2019.
Office Action and Search Report as issued in Russian Patent Application No. 2020137589, dated Apr. 26, 2021.
Machine translation of description of JP 2017-226826 (Year: 2017).

* cited by examiner

*Primary Examiner* — Ling Siu Choi
*Assistant Examiner* — Olga Lucia Donahue
(74) *Attorney, Agent, or Firm* — Pillsbury Winthrop Shaw Pittman LLP

(57) ABSTRACT

To provide an aqueous adhesive for an inorganic material with excellent adhesiveness to the inorganic material. An adhesive improver (J) for an aqueous adhesive of an inorganic material including a (co) polymer (A) containing an unsaturated (poly) carboxylic acid (anhydride) (a1) as a constituent monomer, wherein a weight-average molecular weight of the (co) polymer (A) is 6,000 to 200,000; and an aqueous adhesive for an inorganic material (X) including the adhesive improver (J) for an aqueous adhesive of an inorganic material, a saccharide (B), a polycarboxylic acid (C) having 4 to 24 carbon atoms, and water.

6 Claims, No Drawings

AQUEOUS ADHESIVE FOR INORGANIC MATERIALS

CROSS-REFERENCE TO RELATED APPLICATION(S)

This application is a continuation of International Patent Application No. PCT/JP2019/016197 filed on Apr. 15, 2019, which claims priority to Japanese Patent Application No. 2018-079770 filed on Apr. 18, 2018, the entire disclosures of which are incorporated herein by reference.

TECHNICAL FIELD

The present invention relates to an aqueous adhesive for an inorganic material.

BACKGROUND ART

Conventionally, heat resistant inorganic fiber stacks are composed from inorganic fiber such as glass wool, rock wool, or the like; are prepared by molding the inorganic fiber, after a binder is attached thereto for the purpose of adhesion, in a matted form or the like by a mechanical means; and are used widely as insulating material for buildings and various apparatus, and the like. As the binder, an aqueous binder composed of a phenol resin which is a condensate of a phenol compound and formaldehyde has been widely used conventionally, but the binder normally contains formaldehyde, and there is the problem that formaldehyde is released into the environment from a stack in which it is used, and therefore improved binders that does not contain formaldehyde have been proposed (refer to patent PTL1 and PTL2, for example).

CITATION LIST

Patent Literature

PTL1: Japanese Patent Laid-Open No. 2007-9206
PTL2: Japanese Patent Laid-Open No. 2005-68399

SUMMARY OF INVENTION

Technical Problem

However, the binder of the above PTL1 is a composition comprising an aqueous solution of an oligomer or cooligomer of an ethylenically unsaturated carboxylic acid and polyol, which has a number-average molecular weight of 300 to 900, but the adhesiveness of the binder is not sufficient.

Further, the binder of the above PTL2 consists of a polyacid containing at least two carboxylic acid groups, an acid anhydride group or a salt thereof, and an emulsion polymer having a polyol containing at least two hydroxyl groups and an ethylenically unsaturated acrylic monomer containing an alkyl group having 5 or more carbon atoms as a copolymer unit. However, the spraying performance of the binder is decreased because the emulsion polymer is contained and thus there is a problem of the insufficient adhesiveness.

The purpose of the present invention is to solve the above problem and to provide an aqueous adhesive for an inorganic material with excellent adhesiveness to the inorganic material.

Solution to Problem

The inventors came to the present invention as the result of studying how to achieve the foregoing objective. Specifically, the present invention is an adhesive improver (J) for an aqueous adhesive of an inorganic material comprising a (co) polymer (A) containing an unsaturated (poly) carboxylic acid (anhydride) (a1) as a constituent monomer, wherein a weight-average molecular weight of the (co) polymer (A) is 6,000 to 200,000; and an aqueous adhesive for an inorganic material (X) comprising the adhesive improver (J), a saccharide (B), a polycarboxylic acid (C) having 4 to 24 carbon atoms, and water.

Advantageous Effects of Invention

The adhesive improver (J) for an aqueous adhesive of an inorganic material of the present invention achieves the following effects.

(1) Adding advantageous adhesiveness to an aqueous adhesive for an inorganic material.
(2) Adding advantageous water resistance to an adhered inorganic material (in particular, an inorganic fiber stack).
(3) Adding advantageous rigidity to an adhered inorganic material (in particular, an inorganic fiber stack).

DESCRIPTION OF EMBODIMENTS

<Unsaturated (Poly) Carboxylic Acid (Anhydride) (a1)>

The unsaturated (poly) carboxylic acid (anhydride) (a1) in the present invention is a (poly) carboxylic acid (anhydride) having 3 to 30 carbon atoms [hereinafter, abbreviated as C in places] having one polymerizable unsaturated group. Note that in the present invention, unsaturated (poly) carboxylic acid (anhydride) means unsaturated monocarboxylic acid, unsaturated polycarboxylic acid and/or unsaturated polycarboxylic acid anhydride.

In the (a1), the unsaturated monocarboxylic acid may be aliphatic (3 to 24 C atoms, for example, acrylic acid, methacrylic acid, α-ethyl acrylic acid, crotonic acid, isocrotonic acid) or alicyclic containing (6 to 24 C atoms, for example, cyclohexene carboxylic acid); the unsaturated poly (2 to 3 or more) carboxylic acid (anhydride) may be unsaturated dicarboxylic acid (anhydride) [aliphatic dicarboxylic acid (anhydride) (4 to 24 C atoms, for example, maleic acid, fumaric acid, itaconic acid, citraconic acid, mesaconic acid, and anhydrides thereof), alicyclic containing dicarboxylic acid (anhydride) (8 to 24 C atoms, for example, cyclohexene dicarboxylic acid, cycloheptene dicarboxylic acid, bicycloheptene dicarboxylic acid, methyl tetrahydrophthalic acid, and anhydrides thereof)]. (a1) may be either one type alone or a combination of two or more types.

From the perspective of adhesiveness of the inorganic material, in the above (a1), acrylic acid, methacrylic acid, maleic acid, and maleic anhydride are advantageous, and more advantageous is acrylic acid and methacrylic acid, and particularly advantageous is acrylic acid.

<(Co) Polymer (A)>

The (co) polymer (A) in the present invention is a (co) polymer including the unsaturated (poly) carboxylic acid (anhydride) (a1) as a constituent monomer [hereinafter, may be described as a constituent unit].

In the (A), in so far as the effect of the present invention is not inhibited, an unsaturated monomer (x) other than the foregoing (a1) monomers may be a copolymer to be a constituent monomer.

The unsaturated monomer (x) may be methyl (meth) acrylate, hydroxyalkyl (1-5 C atoms) (meth) acrylate, (meth) acrylamide, styrene, allylamine, (meth) acrylonitrile.

Based on the total weight of (a1), the foregoing (x) is 20 wt. % or less advantageously, and more advantageously 5 wt. % or less, and particularly advantageously 1 wt. % or less.

Weight-average molecular weight [hereinafter abbreviated to Mw. Measurement by later-described gel permeation chromatography (GPC).] of (co) polymer (A) from the perspective of adhesiveness and handling is 6,000 to 200,000, advantageously 8,000 to 100,000, and more advantageously 10,000 to 50,000.

When the Mw is less than 6,000, the adhesiveness is insufficient, and on the other hand, when the Mw exceeds 200,000, handling and rigidity is insufficient.

Mw and the number average molecular weight (Mn) GPC measurement conditions in the present invention are as follows.

<GPC Measurement Conditions>
 [1] Apparatus: gel permeation chromatography
  [Model number "HLC-8120 GPC", made by Tosoh Corporation]
 [2] Columns: "TSK gel G6000 PWxl", "TSK gel G3000 PWxl"
  [Both made by Tosoh Corporation] are connected in series.
 [3] Eluent: 0.5 wt. % of sodium acetate dissolved in methanol/water=30/70 (volume ratio).
 [4] Reference substance: polyethyleneglycol (hereinafter abbreviated as PEG)
 [5] Injection conditions: sample concentration 0.25 wt. % by weight,
  column temperature 40° C.

From the perspective of productivity, the (co) polymer (A) can be prepared by a publicly known solution polymerization method, a water-containing solution polymerization method is advantageous. As a water content rate, using 40 wt. % or more of water in relation to the total solvent amount used is advantageous, and making the entire amount of solvent to be used be water is advantageous.

In a case where an organic solvent is used, it may be either dissolved in water after desolvation after polymerization or may be used as is without desolvation. Organic solvents that can be used alone or together with water are aqueous solvents (solubility in water at 25° C. is 10 g/100 g or more water), for example ketone (such as acetone, methylethylketone (hereinafter abbreviated as MEK), diethyl ketone, and the like), alcohols (methanol, ethanol, isopropanol, and the like), and from the perspective of productivity, acetone, MEK, and isopropanol are advantageous. For the organic solvent, it is possible to use one type or 2 or more types.

This (A) is obtained, for example, as a solution (from an industrial perspective, an aqueous solution is advantageous), and from the perspective of productivity and handleability when preparing an aqueous adhesive in post-processing, the content (wt. %) of (A) in the solution is advantageously 5 to 80%, is more advantageously 10 to 70%, and is particularly advantageously 20 to 60%.

From the perspective of productivity and control of the molecular weight of (A), the polymerization temperature when preparing the foregoing (A) is advantageously 0 to 200° C., and more advantageously 40 to 150° C.

From the perspective of reduction in remaining monomer content in the product and productivity, the polymerization time is advantageously 1 to 10 hours, and more preferably 2 to 8 hours.

The end point of the polymerization reaction can be confirmed by the remaining monomer amount. From the perspective of adhesiveness in relation to an inorganic material, the remaining monomer amount is advantageously 5% or less based on the weight of (A), and more advantageously 3% or less. The remaining monomer amount can be measured by a gas chromatography method.

<Adhesive Improver (J) for an Aqueous Adhesive of an Inorganic Material>

The adhesive improver (J) for an aqueous adhesive of an inorganic material of the present invention contains the (co) polymer (A). From an industrial and handling perspective, the weight of (A) which is based on the weight of (J) is advantageously 10 to 80 wt. %, and is more advantageously 20 to 60 wt. %.

This adhesive improver (J) is used favorably as an adhesive improver for later-described aqueous adhesive for an inorganic material (X).

<Saccharide (B)>

The saccharide (B) in the present invention, for example, may be a sugar alcohol (xylitol, sorbitol, mannitol, maltitol, lactitol, erythritol, or the like), or a (poly) saccharide (dextrin or the like).

The above-described (B), from the perspective of adhesiveness is advantageously a sugar alcohol.

Note that for the above-described (B), it is possible to use one type or a combination of 2 or more types.

<Polycarboxylic Acid (C) Having 4 to 24 Carbon Atoms>

The polycarboxylic acid (C) in the present invention, for example, may be something having 4 to 24 carbon atoms [hereinafter may be abbreviated to C], maleic acid, fumaric acid, itaconic acid, citraconic acid, mesaconic acid, cyclohexene dicarboxylic acid, cycloheptene dicarboxylic acid, bicycloheptene dicarboxylic acid, methyl tetrahydrophthalic acid, citric acid, malic acid, trimellitic acid and their anhydrides.

From the perspective of adhesiveness, the above-described polycarboxylic acid (C) is advantageously trivalent carboxylic acid and more advantageously citric acid.

Note that for the polycarboxylic acid (C), it is possible to use one type alone or to use 2 or more types.

<Aqueous Adhesive for an Inorganic Material (X)>

The aqueous adhesive for an inorganic material (X) of the present invention contains the adhesive improver (J), the saccharide (B), the polycarboxylic acid (C), and water.

The aqueous adhesive for an inorganic material (X) can be used as an aqueous adhesive for an inorganic material (glass, ceramics, metal), and in particular can be used favorably as an aqueous adhesive (a so-called aqueous binder for inorganic fiber) for an inorganic fiber such as glass wool, rock wool, or the like.

Based on the total weight of the saccharide (B) and the polycarboxylic acid (C), from the perspective of rigidity and adhesiveness, the weight of the (co) polymer (A) is advantageously 1 to 20 wt. %, more advantageously 3 to 15 wt. %, and particularly advantageously 5 to 10 wt. %.

The weight ratio [(B)/(C)] between the foregoing saccharide (B) and the polycarboxylic acid (C), from the perspective of adhesiveness, is advantageously 25/75 to 75/25, more advantageously 30/70 to 70/30, and particularly advantageously 35/65 to 65/35.

Based on the weight of the aqueous adhesive (X), the total weight of (A) and (B) and (C), from the perspective of handleability, is advantageously 10 to 70 wt. %, more advantageously 20 to 60 wt. %, and particularly advantageously 30 to 50 wt. %.

In the aqueous adhesive for an inorganic material (X) of the present invention, as necessary, in so far as the effect of the present invention is not inhibited, a curing accelerator (sodium hypophosphite, ammonia, diethylenetriamine, or the like) may be contained. The curing accelerator, based on the total weight of (A) and (B) and (C), from the perspective of adhesiveness, is advantageously 1 to 15 wt. %, more advantageously 2 to 10 wt. %, and particularly advantageously 3 to 5 wt. %.

The method for fabricating the aqueous adhesive for an inorganic material (X) of the present invention is not particularly limited if it is a method by which it is possible to mix and disperse the adhesive improver (J) containing the (co) polymer (A), the saccharide (B), the polycarboxylic acid (C), water, and a curing accelerator added as necessary. The mixing time is, for example, 30 minutes to 3 hours, and uniform mixing of the aqueous adhesive for an inorganic material (X) can be confirmed by visual observation.

Note that the above-described (A), (B), (C), and the curing accelerator may each be mixed in a solution form, advantageously an aqueous solution form, to obtain the aqueous adhesive (X).

Because the aqueous adhesive for an inorganic material (X) of the present invention is not something that consists of the conventional phenol resin which is a condensate of phenol compound and formaldehyde, it does not contain formaldehyde. Also, the aqueous adhesive for an inorganic material (X) is significantly advantageous in inorganic material adhesiveness, adhered inorganic material water resistance, and rigidity, as evaluated by the methods described below.

The aqueous adhesive for an inorganic material (X) of the present invention is favorably used as an aqueous adhesive for inorganic fiber which is a particularly heat-resistant stack material.

The inorganic fiber may be a glass fiber, a slag fiber, rock wool, asbestos, metal fiber, or the like.

<Adhered Inorganic Material>

The adhered inorganic material of the present invention is something in which an inorganic material is bonded by a cured product of the aqueous adhesive for an inorganic material (X). Note that in a case where the inorganic material is an inorganic fiber, advantageously is a later-described inorganic fiber stack.

The cured product adhering amount of the aqueous adhesive (X) based on the weight of the inorganic material, from the perspective of inorganic material adhesiveness and adhered inorganic material rigidity and water resistance, is advantageously 0.5 to 30 wt. %, more advantageously 1 to 20 wt. %, and particularly advantageously 2 to 15%.

<Inorganic Fiber Stack>

The inorganic fiber stack is an inorganic fiber stack in which the aqueous adhesive (X) cured product is attached to an inorganic fiber stack. Specifically, it is obtained by, for example, attaching the aqueous adhesive (X) to inorganic fiber, and thereafter layering that to produce a stack, and heating and molding it, or layering the inorganic fiber or a strand (fiber bundle) thereof to produce a stack, spraying an aqueous adhesive (X) thereon to attach it thereto, and heating and molding.

The method of attaching the aqueous adhesive (X) to the inorganic fiber or a stack thereof may be, for example, a known method such as air spraying or airless spraying, padding, impregnation, roll coating, curtain coating, beater deposition, coagulation, or the like.

The cured product adhesion amount of the aqueous adhesive (X) which is based on the weight of the inorganic fibers (inorganic fiber stack) that constitute the inorganic fiber stack, from the perspective of inorganic fiber adhesiveness, smoothness of the stack front surface, and rigidity and water resistance of the stack, is advantageously 0.5 to 30 wt. %, more advantageously 1 to 20 wt. %, and particularly advantageously 2 to 15%.

At the time of preparation of an adhered inorganic material (advantageously an inorganic fiber stack) of the present invention, after an appropriate amount of the aqueous adhesive (X) is attached to an inorganic material, for example, (advantageously an inorganic fiber), it is heated and cured.

The heating temperature, from the perspective of stack adhesiveness and water resistance, and suppression of coloration of the stack, and from an industrial perspective, is advantageously 100 to 400° C., and more advantageously 200 to 350° C.

The heating time, from the perspective of reaction rate and suppression of coloration of the adhered inorganic material (advantageously inorganic fiber stack), is advantageously 2 to 90 minutes, and more advantageously 5 to 40 minutes.

The adhesive improver (J) and the aqueous adhesive for an inorganic material (X) of the present invention are advantageous in adhesiveness in relation to the inorganic material (advantageously an inorganic fiber), and can provide advantageous rigidity and water resistance in an adhered inorganic material (advantageously an inorganic fiber stack). This is assumed to be due the fact that, by the configurations of (J) and (X), during curing, an adhesive melt tends to collect efficiently at the inorganic material adhesion surface, and at the intersection of the inorganic fibers in the case of inorganic fibers, and curing proceeds efficiently at the adhesion surface and the intersection points, and that the cured product has advantageous resin physical properties.

EXAMPLE

Hereinafter, the present invention will be described in detail with embodiments, but the present invention is not limited thereto. In the following, parts and % respectively indicate parts by weight and wt. %.

Example 1

170 parts of water [solvent] were charged in an autoclave, and nitrogen bubbling was performed while stirring to carry out nitrogen substitution in the autoclave (gaseous oxygen concentration of 500 ppm or less). After increasing the temperature to 100° C. while blowing in nitrogen, a solution [initiator] in which 36.4 parts [reducing agent] sodium hypophosphite were dissolved in 145 parts water and 13.3 parts aqueous hydrogen peroxide (30% aqueous solution) [oxidizing agent] and 310 parts acrylic acid (a1-1) were dripped simultaneously for 3 hours, and a polymerization reaction was conducted by further mixing for 2 hours at 100° C.

Subsequently, water was added so that nonvolatile matter becomes 40%, and an adhesive improver (J-1) [aqueous solution] for an aqueous adhesive for an inorganic material containing (co) polymer (A-1) was obtained. Note that (A-1) had an Mw of 9, 400 and an acid value of 780.

Example 2

505 parts of isopropanol [solvent] were charged in an autoclave, nitrogen bubbling was performed while stirring to carry out nitrogen substitution in the autoclave (gaseous oxygen concentration of 500 ppm or less). After increasing the temperature to 82° C. while blowing in nitrogen, a solution [initiator] in which 0 parts 3-mercaptopropionic acid [chain transfer agent] and 0.75 parts of 2,2'-azobis (2-methylbutyronitrile) are dissolved in 85 parts isopropanol and 330 parts of acrylic acid (a1-1) were dripped simultaneously for 2 hours, and a polymerization reaction was conducted by further mixing for 2 hours at 82° C.

After that, the isopropanol in the solution was desolvated, water was added so that nonvolatile matter becomes 40%, and an adhesive improver (J-2) [aqueous solution] for an aqueous adhesive for an inorganic material containing (co) polymer (A-2) was obtained. Note that (A-2) had an Mw of 15,000 and an acid value of 778.

Examples 3 to 5, Comparative Example 1

In addition to following the reaction composition (parts) in Table 1 in example 2, each adhesive improver (J) was obtained similarly to in example 2.

The results are indicated in Table 1.

Preparation Example 1

46.7 parts of water was charged in a container, and while stirring, 53.3 parts Malbit [made by B food science Co., Ltd, 75% sugar alcohol solution] was charged over 1 hour. Furthermore, it was stirred for 1 hour, and a 40% aqueous solution of (B-1) was obtained.

Preparation Example 3

42.9 parts of water was charged in a container, and while stirring, 57.1 parts Sweet G2 [made by B food science Co., Ltd, 70% sugar alcohol solution] was charged over 1 hour. Furthermore, it was stirred for 1 hour, and a 40% aqueous solution of (B-3) was obtained.

Examples 11 to 23, Comparative Example 11

In accordance with the compound compositions (parts) indicated in Table 2, they were charged in the container, blending was performed, and each aqueous adhesive for an inorganic material (X) was thereby prepared. Using the obtained aqueous adhesive (X), a test piece of inorganic fiber stack was produced according to the following overview, and evaluation was performed by the respective methods described below. The results are indicated in Table 2.

Production of Inorganic Fiber Stack

A glass fiber stack whose height×width×thickness were 30 cm×30 cm×2 cm and whose density was 0.035 g/cm³ was placed in a flat-shaped mold subjected to release processing whose height×width×depth were 30 cm×30 cm×5 cm.

Next, an aqueous adhesive for which the cured product adhering amount is 15% in relation to the weight of the stack was sprayed uniformly on the stack using an air spray. After that, heat processing (drying, curing) was performed for 50 minutes in a circulating dryer at 220° C., and the stack (S-1) whose thickness was approximately 2 cm and whose density was 0.040 g/cm³ was obtained. Similarly, a total of 5 stacks (S-1) were produced.

(1) Evaluation of Adhesiveness

From each stack (S-1), 5 test pieces whose length×width×thickness were 10 cm×1.5 cm×2 cm were cut out. Using Autograph [Model number "AGS-500D", made by Shimazu Corporation], tensile strength was measured in conformance with "7.4 Tensile Strength" of JISR3420 "Glass Fiber General Test Methods", and the average values for the 5 test pieces were used to evaluate adhesiveness by the following criteria.

<Evaluation Criteria>
☆: 500 N/m² or more
◎: 450 N/m² or more and less than 500 N/m²
○: 400 N/m² or more and less than 450 N/m²
Δ: 300 N/m² or more and less than 400 N/m²
x: less than 300 N/m²

(2) Evaluation of Water Resistance

From each stack (S-1), 5 test pieces whose length×width×thickness were 10 cm×1.5 cm×2 cm were cut out. These were soaked for 10 minutes in tap water at 25° C. Then they were extracted, allowed to stand on a sieve having openings of 400 μm for 60 minutes at 30° C. and 40% RH.

The tensile strength of the test pieces after the water resistance test was measured similarly to in the foregoing (1), the strength after the water resistance test×100/the intensities in the foregoing (1) (units: %) was calculated, and water resistance was evaluated by the following evaluation criteria.

<Evaluation Criteria>
☆: 90% or more
◎: 80% or more and less than 90%
○: 70% or more and less than 80%
Δ: 60% or more and less than 70%
x: less than 60%

(3) Evaluation of Rigidity

From each stack (S-1), 5 test pieces whose length×width×thickness were 30 cm×1 cm×0.5 cm were cut out.

The test piece was placed on a base whose distance between supporting points is 25 cm, a deflection ratio of the test pieces at 25° C. was measured, and for the average value of the 5 test pieces, the rigidity was evaluated by the following criteria.

The deflection ratio (%) of the test piece=deflection (mm)×100/250

<Evaluation Criteria>
☆: A deflection ratio of less than 1.0%
◎: A deflection ratio of 1.0% or more and less than 2.0%
○: A deflection ratio of 2.0% or more and less than 3.0%
Δ: A deflection ratio of 3.0% or more and less than 5.0%
x: A deflection ratio of 5.0% or more

TABLE 1

|  | Example | | | | | Comparative Example |
|---|---|---|---|---|---|---|
|  | 1 | 2 | 3 | 4 | 5 | 1 |
| Adhesive improver | J-1 | J-2 | J-3 | J-4 | J-5 | CJ-1 |
| (co)polymer(A) | A-1 | A-2 | A-3 | A-4 | A-5 | CA-1 |

TABLE 1-continued

| | | | Example | | | | | Comparative Example |
|---|---|---|---|---|---|---|---|---|
| | | | 1 | 2 | 3 | 4 | 5 | 1 |
| Reaction composition (parts) | Solvent | water | 170 | | 150 | 150 | 170 | 50 |
| | | Isopropanol | | 505 | 250 | 300 | 50 | 95.1 |
| | Chain Transfer agent | 3-mercapto-propionic acid | | | | | | |
| | Initiator | 2,'2-azobis(2,4-dimethyl-valeronitrile) | | | 3.89 | | | |
| | | 2,'2-azobis(2-methyl-butyronitrile) | | 0.75 | | 0.52 | | 0.31 |
| | | Iron sulfate | | | | | 2.7 | |
| | | Aqueous hydrogen peroxide (30% aqueous solution) | 13.3 | | | | | |
| | | Sodium hypophosphite | 36.4 | | | | 6.9 | |
| | | Isopropanol | | 85 | 50 | 30 | | 10.5 |
| | | water | 145 | | | | 100 | |
| | Unsaturated (poly) Carboxylic acid (anhydride) (a1) | Acrylic acid (a1-1) | 310 | 330 | | | 300 | |
| | | Methacrylic acid (a1-2) | | | 250 | | | |
| | | Maleic anhydride (a1-3) | | | | 380 | | |
| | Monomer (x) | Acrylamide | | | | | | 55.0 |
| Property of (co)polymer | | Mw | 9,400 | 15,000 | 6,700 | 48,000 | 81,000 | 12,000 |
| | | Acid value | 780 | 778 | 650 | 1140 | 780 | 0 |

TABLE 2

| | | | Example | | | | | | | | | | | | | Comparative Example |
|---|---|---|---|---|---|---|---|---|---|---|---|---|---|---|---|---|
| | | | 11 X-1 | 12 X-2 | 13 X-3 | 14 X-4 | 15 X-5 | 16 X-6 | 17 X-7 | 18 X-8 | 19 X-9 | 20 X-10 | 21 X-11 | 22 X-12 | 23 X-13 | 11 CX-1 |
| Aqueous adhesive for an inorganic material | | | | | | | | | | | | | | | | |
| Compound | Adhesive improver (J) | J-1 | 5 | 25 | | | | | | | | 8 | | | | |
| | | J-2 | | | 2.5 | | | | 7 | | 2.5 | | 1.5 | | 2.5 | |
| | | J-3 | | | | 2.5 | | 3 | | | | | | | | |
| | | J-4 | | | | | 2.5 | | | | | | | | | |
| | | J-5 | | | | | | | | | | | | | | |
| | | CJ-1 | | | | | | | | 1.5 | | | | 5 | | 5 |
| | Saccharide (B) | 40% aqueous solution of (B-1) | 22 | 22 | 22 | 22 | 22 | | | 22 | | | | | 22 | 22 |
| | | 40% aqueous solution of sorbitol (B-2) | | | | | | 30 | | | | 25 | | | | |
| | | 40% aqueous solution of (B-3) | | | | | | | 25 | | | | | | | |
| | | 40% aqueous solution of xylitol (B-4) | | | | | | | | | | | 22 | | | |
| | | 40% aqueous solution of sucrose (B-5) | | | | | | | | | | | | 22 | | |
| | | 40% aqueous solution of dextrin (B-6) | | | | | | | | | 25 | | | | | |
| | Polycarboxylic acid (C) | 40% aqueous solution of citric acid (C-1) | 26 | 26 | 26 | 26 | 26 | 20 | | 26 | | 20 | 26 | 26 | | 26 |
| | | 40% aqueous solution of trimellitic acid (C-2) | | | | | | | 24 | | | | | | | |
| | | 40% aqueous solution of fumaric acid (C-3) | | | | | | | | | 25 | | | | | |
| | | 40% aqueous solution of malic acid (C-4) | | | | | | | | | | | | | 20 | |
| | Curing accelerator | Sodium hypophosphite | 2 | | 2 | 2 | | 5 | | | | 3 | | | | 2 |
| | | Water | 50 | 50 | 50 | 50 | 50 | 50 | 50 | 50 | 50 | 50 | 50 | 50 | 50 | 50 |

TABLE 2-continued

| | | | | | | Example | | | | | | | | Comparative Example |
|---|---|---|---|---|---|---|---|---|---|---|---|---|---|---|
| Aqueous adhesive for an inorganic material | 11 X-1 | 12 X-2 | 13 X-3 | 14 X-4 | 15 X-5 | 16 X-6 | 17 X-7 | 18 X-8 | 19 X-9 | 20 X-10 | 21 X-11 | 22 X-12 | 23 X-13 | 11 CX-1 |
| Weight of (A) based on the total weight of (B) and (C) | 10 | 5 | 5 | 5 | 5 | 6 | 14 | 4 | 5 | 18 | 3 | 10 | 6 | — |
| Evaluation Results — Adhesiveness | ☆ | ◎ | ☆ | ○ | ○ | ○ | ☆ | ◎ | ○ | ☆ | ◎ | ◎ | ○ | X |
| Water resistance | ☆ | ◎ | ☆ | ◎ | ◎ | ◎ | ☆ | ◎ | ◎ | ◎ | ◎ | ◎ | ◎ | Δ |
| Rigidity | ◎ | ☆ | ◎ | ◎ | ○ | ◎ | ◎ | ◎ | ☆ | ◎ | ◎ | ◎ | ☆ | X |

From the results of Tables 1 and 2, it can be seen that the adhesive improver (J) for the aqueous adhesive of an inorganic material of the present invention, compared to the comparative example, adds advantageous adhesiveness of the inorganic material (in particular the inorganic fiber) to the aqueous adhesive for an inorganic material, and further adds advantageous water resistance and rigidity to the adhered inorganic material (in particular inorganic fiber stack).

The present invention is not limited to the above embodiments and various changes and modifications can be made within the spirit and scope of the present invention. Therefore, to apprise the public of the scope of the present invention, the following claims are made.

USABILITY IN INDUSTRY

The adhesive improver (J) and the aqueous adhesive for an inorganic material (X) of the present invention is suitable for adhering inorganic material (in particular, a glass fiber which is an inorganic fiber which is a heat-resistant stack material), and since an adhered inorganic material in which the aqueous adhesive is used (in particular, an inorganic fiber stack) can be applied in a wide variety of fields as various adhered inorganic materials, and in particular as a heat insulating material, a heat retention material, and a sound absorbing material for buildings and various apparatuses, it is highly useful.

What is claimed is:

1. An aqueous adhesive for an inorganic material, the aqueous adhesive comprising:
   an adhesive improver (J) comprising a (co)polymer (A) containing an unsaturated monocarboxylic acid and/or an unsaturated polycarboxylic acid and/or an unsaturated polycarboxylic acid anhydride (a1) as a constituent monomer, wherein a weight-average molecular weight of the (co) polymer (A) is from 6,000 to 200,000,
   a saccharide (B) that is a sugar alcohol,
   a polycarboxylic acid (C) having 4 to 24 carbon atoms, and
   water,
   wherein a weight ratio [(B)/(C)] of the saccharide (B) and polycarboxylic acid (C) is 25/75 to 75/25.

2. The aqueous adhesive of claim 1, wherein the weight of the (co) polymer (A) is 1 to 20 wt. % based on the total weight of the saccharide (B) and polycarboxylic acid (C).

3. An adhesive article of an inorganic material bonded with a cured material of the aqueous adhesive of claim 1.

4. The aqueous adhesive of claim 1, wherein the weight-average molecular weight of the (co) polymer (A) is 8,000 to 100,000.

5. The aqueous adhesive of claim 1, wherein the sugar alcohol is xylitol, sorbitol, mannitol, maltitol or lactitol.

6. An aqueous adhesive for an inorganic material, the aqueous adhesive comprising:
   an adhesive improver (J) comprising a (co)polymer (A) containing an unsaturated monocarboxylic acid and/or an unsaturated polycarboxylic acid and/or an unsaturated polycarboxylic acid anhydride (a1) as a constituent monomer, wherein a weight-average molecular weight of the (co) polymer (A) is from 6,000 to 200,000,
   a saccharide (B) that is selected from the group consisting of xylitol, sorbitol, mannitol, maltitol, lactitol and any proper combination thereof,
   a polycarboxylic acid (C) having 4 to 24 carbon atoms, and
   water.

* * * * *